US008096469B2

(12) United States Patent
Webb

(10) Patent No.: US 8,096,469 B2
(45) Date of Patent: Jan. 17, 2012

(54) METHODS FOR RECEIVING CREDIT CARD APPLICATIONS AT A FUEL DISPENSER

(75) Inventor: Timothy W. Webb, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 901 days.

(21) Appl. No.: 12/111,764

(22) Filed: Apr. 29, 2008

(65) Prior Publication Data

US 2009/0072023 A1    Mar. 19, 2009

Related U.S. Application Data

(63) Continuation of application No. 11/306,304, filed on Dec. 22, 2005, now Pat. No. 7,364,073.

(51) Int. Cl.
*G06K 5/00* (2006.01)
(52) U.S. Cl. ........................................ 235/381; 235/380
(58) Field of Classification Search .................. 235/384, 235/380, 381; 705/14, 38
See application file for complete search history.

(56) References Cited

U.S. PATENT DOCUMENTS

| | | | | |
|---|---|---|---|---|
| 5,557,529 A * | 9/1996 | Warn et al. | ..................... | 700/232 |
| 6,193,154 B1 | 2/2001 | Phillips et al. | | |
| 6,351,689 B1 * | 2/2002 | Carr et al. | ..................... | 700/244 |
| 6,405,182 B1 | 6/2002 | Cuervo | | |
| 6,643,623 B1 | 11/2003 | Kolls | | |
| 7,364,073 B2 * | 4/2008 | Webb | ............................ | 235/384 |
| 2002/0046185 A1 | 4/2002 | Villart et al. | | |
| 2003/0236740 A1 | 12/2003 | Lang et al. | | |
| 2004/0225604 A1 | 11/2004 | Foss, Jr. et al. | | |
| 2005/0044017 A1 | 2/2005 | Foss, Jr. et al. | | |
| 2005/0044039 A1 | 2/2005 | Greer et al. | | |
| 2005/0125336 A1 | 6/2005 | Rosenblatt et al. | | |
| 2005/0173520 A1 | 8/2005 | Jaros et al. | | |
| 2006/0271431 A1 | 11/2006 | Wehr et al. | | |
| 2007/0145120 A1 * | 6/2007 | Webb | ............................ | 235/380 |
| 2009/0072023 A1 * | 3/2009 | Webb | ............................ | 235/380 |
| 2010/0258587 A1 * | 10/2010 | Wheeler et al. | ................... | 222/2 |

* cited by examiner

*Primary Examiner* — Thien M Le
(74) *Attorney, Agent, or Firm* — Troutman Sanders LLP; Robert R. Elliott, Jr.

(57) ABSTRACT

Credit card applications typically involve the help of a third party to input the necessary data required by a credit card issuing agency. Using the present invention, a customer at a fuel dispenser can complete a credit card application and have it approved or denied in a quick and easy transaction, without the need of assistance from a third party. All required data at the fuel dispenser is entered through a user interface which includes card swipe inputs and numeric inputs through a numeric key pad. The customer does not make any alphabetical inputs on a typical keyboard because fuel dispensers do not have keyboards.

8 Claims, 3 Drawing Sheets

US 8,096,469 B2

METHODS FOR RECEIVING CREDIT CARD APPLICATIONS AT A FUEL DISPENSER

CROSS REFERENCE TO RELATED APPLICATION & PRIORITY CLAIM

This application is a continuation of U.S. patent application Ser. No. 11/306,304, entitled "Method For Receiving Credit Card Applications At A Fuel Dispenser," filed on Dec. 22, 2005, now U.S. Pat. No. 7,364,073, which is hereby incorporated by reference.

BACKGROUND OF THE INVENTION

Applications for credit cards typically require the applicant to fill out a paper application form which is sent to a credit card authorizing agency. Upon receipt, the information on the paper application is typically keyed into an electronic form used by the credit card authorizing agency. In some situations, a clerk or cashier may assist an applicant with an electronic application at a retail location. In either situation, a third party is involved with the data entry phase of the application process. The present invention eliminates the need for a third party to enter data during the data entry phase of the credit card application process. All data entry is done by the applicant at a fuel dispenser.

SUMMARY OF THE INVENTION

A typical fuel dispenser includes a conventional fluid transfer assembly and a conventional volumetric measurement/pricing assembly. In addition a typical fuel dispenser includes a user interface having a credit or debit card reader, a numeric key pad, a screen to display messages and prompts to the user, a printer, various touch pads, levers and/or switches for product selection and/or other touch pads for input of additional data. In short, a typical fuel dispenser is a complicated apparatus that performs many different functions. With the addition of an application processor the typical fuel dispenser can be converted into an apparatus for receiving credit card applications without the help of a third party with data entry for the credit card application. The application processor can be a CPU, PLC or other electronic circuits.

DETAILED DESCRIPTION OF THE INVENTION

Figure 1:
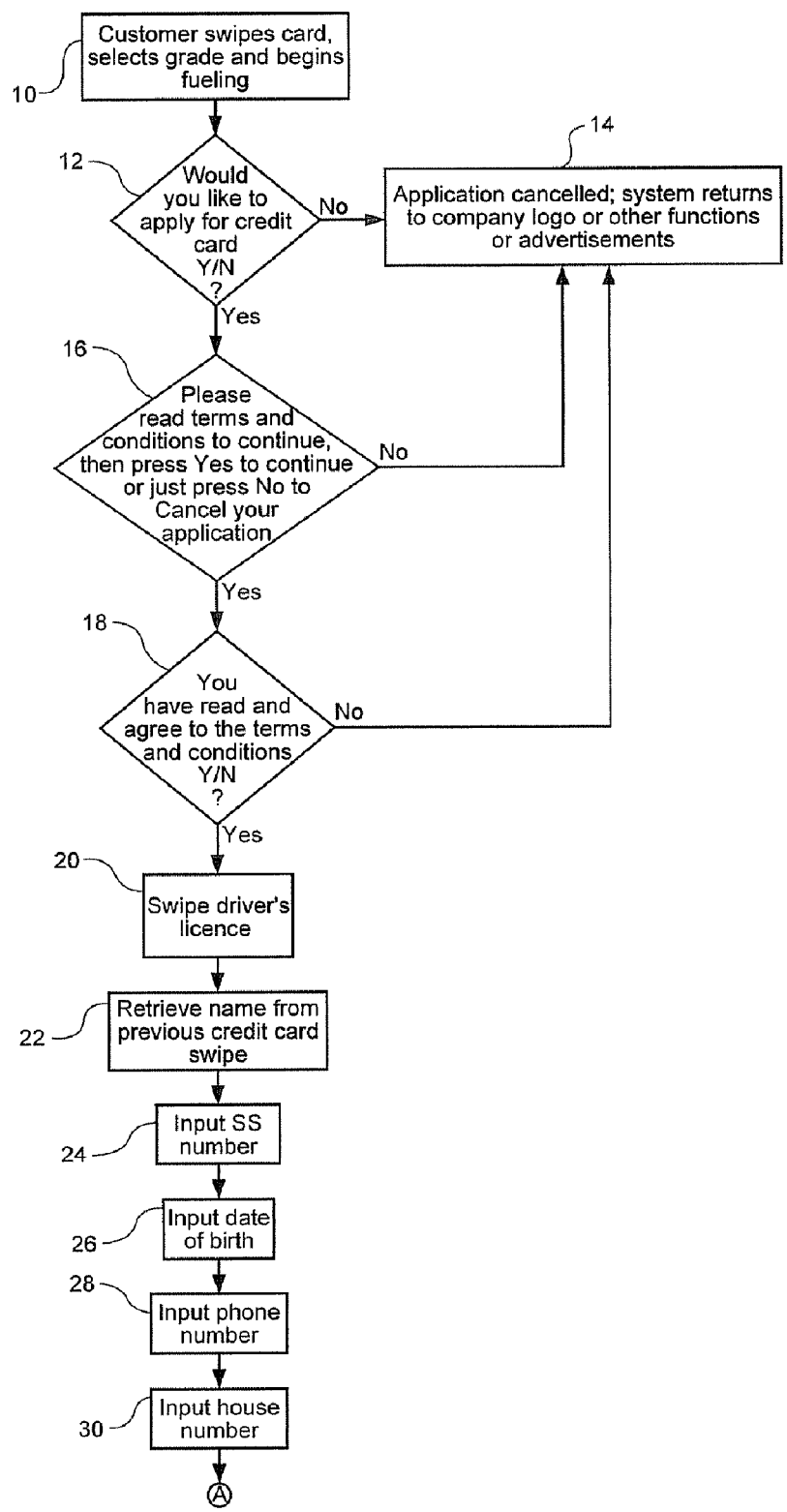
FIGS. 1 and 2 are the flowchart of the process of the present invention for receiving a credit card application at a fuel dispenser.
Figure 2:
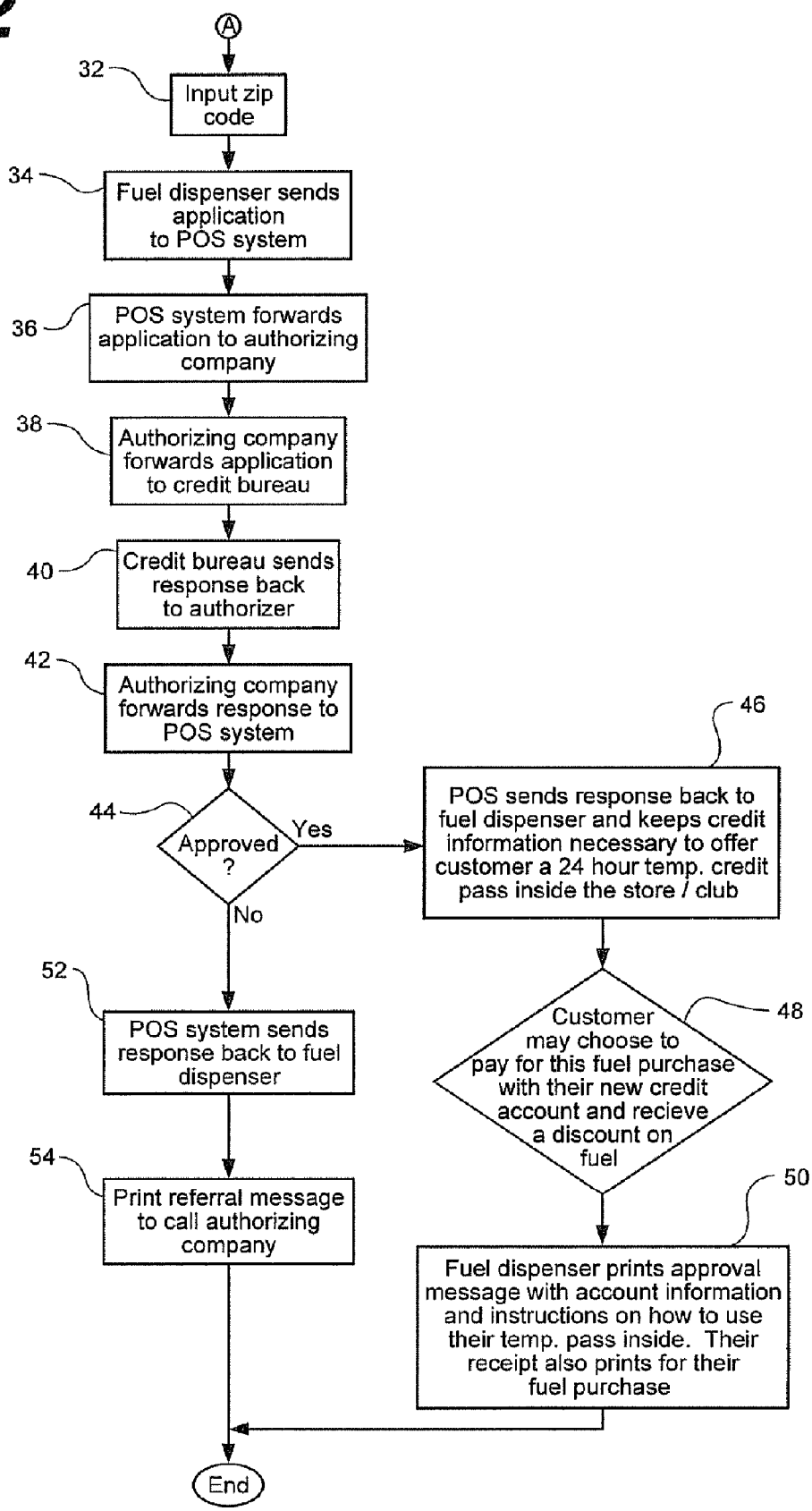

FIGS. 1 and 2 are the flowchart of the method of the present invention for receiving a credit card application at a fuel dispenser. The term "Credit Card Application" as used herein is to be broadly construed and includes an application for a credit card, a debit card or a combined credit/debit card.

In order to entice a user to complete a Credit Card Application at a fuel dispenser, some special discount or other incentive may be necessary. For example, Sam's Club® discount stores, a division of Wal-Mart Stores, Inc. offers a 3¢ per gallon discount on fuel paid for with Sam's Club credit card. A fuel purchase at Sam's Club typically occurs as follows: the user goes to a fuel dispenser outside a Sam's Club store and swipes their Sam's Club membership card at the fuel dispenser, the user puts fuel in their car and pays with a credit card. If the user has a Sam's Club credit card, they get a 3¢ per gallon discount deducted from the pump price; if they do not have a Sam's Credit card, they may pay with any other approved credit card, but they do not receive the 3¢ discount. One way to entice a user to complete a Credit Card Application at the fuel dispenser is to offer an immediate discount on the current fuel purchase, if the Credit Card Application is approved.

The process is as follows. The customer pulls up to the fuel dispenser, swipes a credit card, selects a fuel grade and begins fueling 10. The customer's name is stored temporarily in a memory. If the customer uses other approved card than proposed credit card, an application procedure begins. The query 12 to complete a Credit Card application is typically made on the display screen of the fuel dispenser. These display screens are known to those skilled in the art and are typically LCD's or LED's. An incentive to complete a Credit Card Application at the fuel dispenser may be announced to the user by any point-of-sale ("POS") display, such as conventional signage at the top of the fuel dispenser, banners around the area, on the display screen of the fuel dispenser, through a speaker in the area, or in any other way. The incentive is an optional part of the process.

If the customer declines the offer to complete a Credit Card Application, they press the "no" touch pad or appropriate key on the numeric key pad. The display screen then returns to a company logo, advertisement or another function, box 14. If the customer accepts the offer to complete a Credit Card Application, they must press the "yes" touch pad or an appropriate key on the numeric key pad, box 12. The display screen then advises the customer to read the terms and conditions, box 16, and press "yes" to continue or "no" to cancel the application. The customer may then read the terms and conditions on the display screen or from some other handy POS document. If the customer rejects the terms and conditions, they press the "no" touch pad and the display screen returns to box 14, previously discussed. If the customer accepts and reviews the terms and conditions, they acknowledge the acceptance, box 18, by pressing the "yes" touch pad or appropriate key on the numeric key pad.

The display then prompts the customer to swipe their driver's license through the card reader, box 20. Card readers for credit cards and driver's licenses are known to those skilled in the art. As used herein, the term "card reader" means an electronic input device that is: a) of the "swipe" variety, suitable for reading a memory on a card or card-like device; b) a scanner that is suitable for reading a barcode, such as a magnetic strip reader; c) a proximity card reader; or d) a smartcard reader. Any magnetic or electronic device suitable for receiving information from the credit card or driver's license is meant to be included in the term "card reader;" The customer identification data from the driver's license swipe, such as the customer's date of birth, and/or driver's license number, is also stored into memory. The identification data stored in the driver's license are different in different states. If the customer information data cannot be read from the driver's license swipe or if it is prohibited to read customer information from the driver's license, then the customer will need to manually key in such information through the numeric key pad on the user interface.

The program then retrieves the customer's name from the previous credit card swipe, box 22. The display screen prompts the customer to input other information required to apply for the credit card, such as their social security number and/or telephone number, on the keypad of the user interface of the fuel dispenser, box 24. For example, after entry of the appropriate number of digits, the display screen prompts the customer to input their date of birth, numerically on the keypad of the user interface, box 26. After entry of the appropriate number of digits, the display screen prompts the customer to input their telephone number on the keypad of the user interface, box 28. Again after the input of the appropriate number of digits, the display screen prompts the customer to input their house number on the keypad of the user interface, box 30. After input of the house number, the display screen prompts the customer to input their zip code on the keypad of the user interface, box 32. This data is stored in memory and formatted it into the Credit Card Application which is transmitted to the store POS system, box 34, which is remote from the fuel dispenser.

The store POS system electronically forwards the Credit Card Application to a credit card authorizing company, box 36, such as a bank which electronically forwards the Credit Card Application to a credit bureau, box 38. The credit bureau then attempts to match the customer information, the driver's license information and the numeric customer identification information with a single individual listed in the credit bureau's memory. If a match is located the credit card application and the customer are analyzed for creditworthiness.

The credit bureau sends a response back to the credit card authorizing company, box 40 which includes the alphabetical street name of the customer which is retrieved from the credit bureau's memory. The credit card authorizing company makes a decision whether to authorize or deny the Credit Card Application and forwards this decision to the POS system, box 42. If the Credit Card Application is denied, the POS system sends a response back to the fuel dispenser, box 52. The printer then prints a message to the customer to contact the credit card authorizing company, box 54, concerning the denial of the Credit Card Application.

If the Credit Card Application is approved, the POS system sends an authorization back to the fuel dispenser and keeps the credit information necessary to offer the customer temporary credit pass inside a store in general proximity to the fuel dispenser, box 46. The temporary credit pass may be limited in time. A traditional credit card will be issued by the credit card authorizing company and mailed to the customer. (The numeric house number is provided in the credit card application and the alphabetical street name is provided by the credit bureau.) The display screen then asks the customer if they wish to pay for the present fuel purchase with their new credit account and receive a discount on the purchase, box 48. If a "yes" touch pad is pressed the printer prints out an approval message with account information and instructions on how to use a temporary credit pass in a store in immediate proximity to the fuel dispenser. Typically the store and the fuel dispenser are owned by the same company, i.e. Sam's Club or Wal-Mart. The printer also prints out a receipt for their fuel purchase, box 50.

Figure 3:
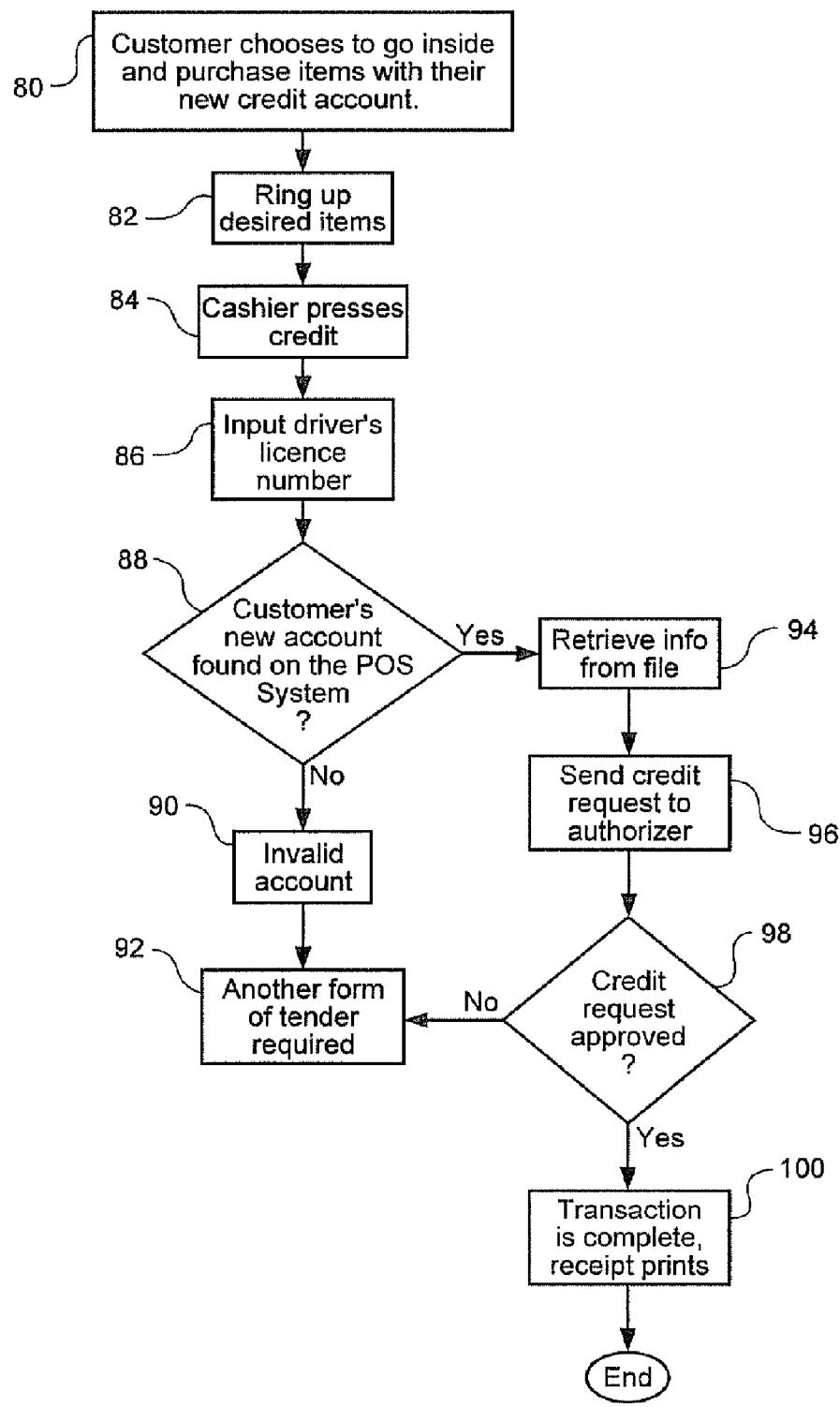
FIG. 3 is a flowchart of the process whereby the owner of a new credit card account can go into a store in immediate proximity to the fuel dispenser and charge a product purchase.

FIG. 3 is a flowchart of the process whereby the owner of the new credit card account decides to go into a store in immediate proximity to the fuel dispenser and charge a product purchase, box 80, after receipt of the temporary credit pass described above. In this process, the store and the fuel dispenser have common ownership. The customer selects one or more products for purchase and takes them to the check out station so the prices can be rung up at the cashier, box 82. The cashier selects a credit purchase, box 84. The customer's driver's license number is then inputted into the cash register, box 86. The cash register queries the POS system for a new account based on the customer's driver's license number, box 88. If a new account does not exist, or if the driver's license number has been improperly entered, the POS system sends an "invalid account" signal to the cash register, box 90 and the customer must pay for the products in some other fashion, box 92.

If the POS system retrieves the account from memory, box 94, it sends a request for credit approval of the proposed sale to the credit card authorizing company, box 96. The credit card authorizing company uses conventional means to approve or reject the request, box 98. If the request for credit approval is denied, another form of payment must be made, box 92. If the request for credit approval is approved, the credit card authorizing company sends an approved signal to the POS system which sends an approved signal to the cash register which prints a receipt, box 100. The transaction then is complete and the customer is free to leave the store.

I claim:

1. A method for receiving a credit card application at a fuel dispenser without the need of assistance from a third party, the method comprising:
   receiving customer information from an existing credit card through a user interface at a fuel dispenser;
   offering a credit card application to the customer at the fuel dispenser;
   receiving information from the customer's driver's license through the user interface at the fuel dispenser by electronically inputting data from the customer's driver's license;
   receiving additional customer information through the user interface at the fuel dispenser; and
   transmitting customer information from an existing credit card, the driver's license information, and the numeric customer identification information to a point of sale (POS) system and then to a credit card authorizing company for review and if approved, issuance of a new credit card account.

2. A fuel dispenser configured to implement the method of claim 1.

3. A computer readable medium for receiving credit card applications at a fuel dispenser without the need of assistance from a third party, the computer readable medium comprising:
   executable computer code to receive customer information from an existing credit card at a fuel dispenser without the need of assistance from a third party;
   executable computer code to provide credit card application information to the customer at the fuel dispenser without the need of assistance from a third party;
   executable computer code to receive additional customer information at the fuel dispenser without the need of assistance from a third party; and
   executable computer code to transmit received customer information comprising credit card application information to a credit card authorizing company.

4. A method for receiving a credit card application from a customer at a fuel dispenser without aid of an attendant, the method comprising:
   receiving data from a customer's credit card as a result of a customer's swiping the credit card at a fuel dispenser;
   providing a discount on a fuel purchase as an incentive to complete a credit card application at the fuel dispenser;
   retrieving the customer's name from an existing credit card swiped through a card reader at the fuel dispenser; and
   transmitting the customer information from the fuel dispenser to at least one of a point of sale (POS) system and a financial card issuing company.

5. A fuel dispenser configured to implement the method of claim 4.

6. A method for receiving a credit card application at a fuel dispenser without aid from an attendant, the method comprising:
- receiving customer information from an existing credit card through a fuel dispenser user interface as a result of swiping an existing credit card; offering a credit card application to a customer at the fuel dispenser;
- receiving additional customer identification information through a user interface at the fuel dispenser;
- transmitting received customer information to at least one of a credit card authorizing company or a credit bureau;
- receiving a response from at least one of the credit bureau or the credit card authorizing company; and
- providing an approval or rejection of the credit card application to the fuel dispenser for customer review.

7. A fuel dispenser configured to implement the method of claim 6.

8. A computer readable medium for receiving credit card applications at a fuel dispenser without the need of assistance from a third party, the computer readable medium comprising:
- executable computer code to receive customer information from an existing credit card through a fuel dispenser user interface as a result of swiping an existing credit card;
- executable computer code to provide a credit card application to a customer at the fuel dispenser;
- executable computer code to receive additional customer identification information through a user interface at the fuel dispenser;
- executable computer code to transmit received customer information to at least one of a credit card authorizing company or a credit bureau;
- executable computer code to receive a response from at least one of the credit bureau or the credit card authorizing company; and
- executable computer code to provide an approval or rejection of the credit card application to the fuel dispenser for customer review.

* * * * *